Aug. 18, 1953        J. M. MARSHALL        2,649,392
METHOD OF FORMING SEAL IN SYNTHETIC PLASTIC PACKAGES
Filed March 30, 1950
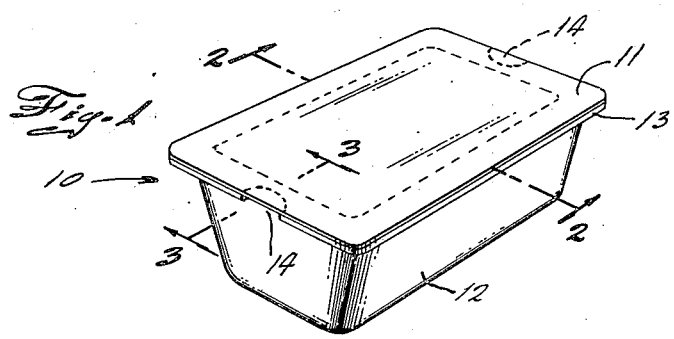
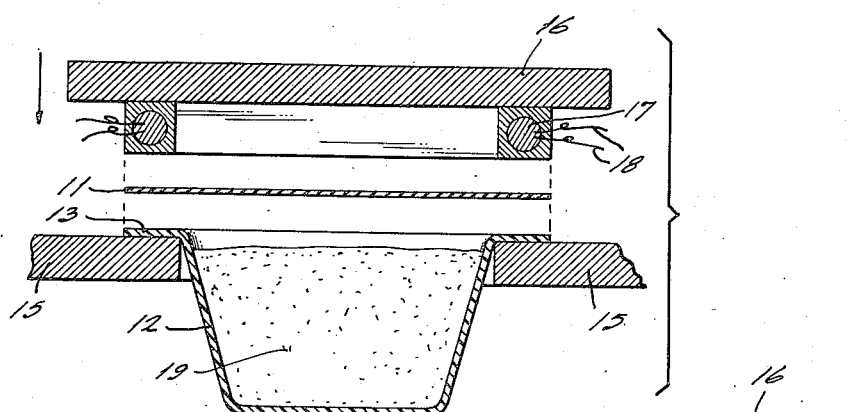
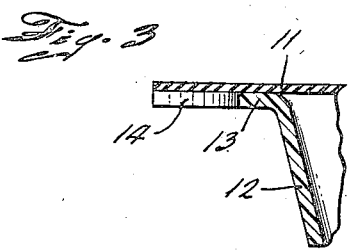
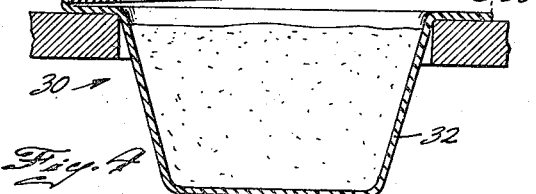
INVENTOR.
JOHN M. MARSHALL
BY
ATTORNEY Patented Aug. 18, 1953

2,649,392

UNITED STATES PATENT OFFICE 2,649,392

METHOD OF FORMING SEAL IN SYNTHETIC PLASTIC PACKAGES

John M. Marshall, Reading, Pa., assignor to Kraft Foods Company, Chicago, Ill., a corporation of Delaware Application March 30, 1950, Serial No. 152,958

3 Claims. (Cl. 154—83)

The present invention relates to packages of synthetic thermoplastic material and methods of fabricating the same, and refers more particularly to packages in which a weak bond between certain portions of the package is desired rather than a strong bond.

Thermoplastic sheet material is highly favored for many uses in the packaging industry, including the packaging of food, in which application the transparency of the sheet and its ability to preserve the freshness of the contents are important considerations.

The excellent seal between container and cover which is obtained by heat sealing of the thermoplastic package has in fact proved too good from the viewpoint of convenience in unpackaging the food or other contents. The material of the sheet being strong initially, the sealed portion comprising two such sheets fused together is too strong to be torn by the hands. Efforts by fabricators to produce an efficient but easily ruptured seal have been unsuccessful.

An object of the present invention is the provision of a thermoplastic package, for instance a package for food, in which the cover is fastened to the container by heat sealing, the cover furthermore being easily removable from the container by reason of the low strength of the bond between cover and container.

Another object is the provision of such a package from readily available materials.

Still another object is the provision of a special shape of package to utilize fully the advantages of the low strength bond between container and closure.

Still another object is that the fabrication of such package may be carried out on conventional equipment presently used for the manufacture of thermoplastic packages.

Other objects will become evident as the invention is described.

In accomplishing the objects of the present invention a package of thermoplastic material is provided, comprising portions constituted by materials of different respective composition. When these portions are heat sealed together by conventional heat sealing equipment, they adhere and cohere but do not unite in the sense of fusing or welding. The cover may therefore be peeled off the container easily.

Cutouts are further provided in the container so that a person's finger may contact the underside of the cover directly to start the peeling action.

Two principal types of package are provided. In the first, the cover is of a single material and the container is of a single different material, the respective materials being substantially chemically inert with respect to each other and further being mutually immiscible under heat sealing conditions. A preferred combination for this purpose is a container of vinyl chloride-acetate and a cover of chlorinated rubber.

In the second type of package, a single sheet is used for the entire package, but the area to be heat sealed is first coated with the different thermoplastic. The coating may be applied from a solvent solution and dried before making the joint. The low strength joint between the two materials may then be made by heat sealing.

Other objects of this invention will in part be obvious and in part hereinafter be pointed out. The invention, accordingly, consists in the features of construction, combinations of elements and arrangements of parts, and methods of sealing, which will be exemplified in the constructions hereinafter described. In the accompanying drawing, in which are shown two of the various possible illustrative embodiments of this invention:

Figure 1 is a perspective view of a package embodying the first form of the invention;

Figure 2 is an exploded section on the line 2—2 of Figure 1, and also illustrating conventional heat sealing equipment in operative relation to the package before sealing;

Figure 3 is a section on the line 3—3 of Figure 1; and

Figure 4 is a fragmentary view showing an alternative form of package.

The invention contemplates the formation of continuous seals capable of forming a hermetic closure against moisture and air for a package or the like, rather than a closure in which separation of the elements is provided for by joining only at separated points. Such continuous hermetic seal with the required low mechanical strength to permit easy peeling off or separation of the elements may be provided in various ways, which will now be described.

Referring now in detail to the drawings, Figures 1 to 3 illustrate a package 10 of synthetic thermoplastic material, comprising a container portion 12 of vinyl chloride-acetate or the like and a cover portion 11 of chlorinated rubber. Container 12 is of truncated tapered section both laterally and longitudinally, and is provided with an outwardly projecting flange portion 13 which is relieved to provide the recesses 14.

Figure 2, which has been exploded for clarity, shows the container 12 supported by its flange 13 in conventional heat sealing machinery, including the bed 15 and platen 16 provided with heater elements 17 to which electric current is supplied by lead wires 18.

The particular package 10 herein illustrated is filled with marmalade 19 and measures about one inch wide by two long. The cover 11 and container 12, upon heat sealing by pressure of twenty-five to two hundred fifty pounds per square inch at temperatures of two hundred fifty to three hundred degrees Fahrenhent adhere or cohere along their interface 20 without fusion or welding, as illustrated in Figure 3. The seal thus formed is effective to exclude air but possesses low mechanical strength and is thus conveniently ruptured by pushing one's finger against the portion of cover 11 exposed by recess 14. Cover 11 then peels off with extreme ease.

Aside from ease of unpackaging, which is the principal object of the invention, this package offers important economies in fabrication. In particular, the range of temperature and pressure is much wider than allowable in conventional heat sealing, for which the material must be rendered liquid at the interface. In the present process, the materials will adhere in any state from soft to liquid, and will furthermore and most importantly exhibit no dispersion of the material of one component into the material of the other. Preferred pressure is between one hundred fifty and two hundred fifty pounds per square inch, but the previously mentioned wider range of pressure gives satisfactory results.

My choice of materials for cover 11 and container 12 is due to the fact that chlorinated rubber and vinyl chloride-acetate are mutually immiscible under heat sealing conditions, and even in the liquid state show no tendency to weld, or fuse, and there is no dispersion of particles from either into the body of the other.

In Figure 4, I have illustrated a second form of my invention in which the package 30 comprises a body portion, the latter comprising in a single sheet or continuous phase of homogeneous material the cover portion 31 and container portion 32, portions 31 and 32 being of vinyl chloride-acetate. In order to heat seal this material with a low strength bond, I have coated a portion of it with a bonding strip 33 of chlorinated rubber from a solvent solution of benzene, which it will be noted is not too active a solvent of the material being coated. The solvent being evaporated in any desired manner, heat sealing may proceed under the conditions described above in connection with the first form of the invention. The structure may be similar to that of Figures 1 to 3, apart from the cover formation, including recesses 14 as in that structure, in any convenient location.

In a case in which a low strength bond by heat sealing of a chlorinated rubber package is desired, a bonding strip of vinyl chloride acetate is applied from a solvent solution of methyl (iso)-butyl ketone, which is not a too active solvent of chlorinated rubber, with the same effect as described in connection with Figure 4.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. The method of forming a seal in a package of synthetic thermoplastic materials, said package comprising component parts, one of said parts consisting of chlorinated rubber, the other of said parts consisting of vinyl chloride acetate, said component parts being immiscible under heat sealing conditions, which method comprises compressing said component parts together under heat and pressure to form a low strength hermetic seal, wherein the sealed component parts are composed, respectively, only of chlorinated rubber and vinyl chloride acetate, whereby a seal is formed between said component parts which is easily ruptured.

2. The method according to claim 1, in which pressure in a range from twenty-five to two hundred fifty pounds per square inch and temperatures in a range from two hundred fifty to three hundred degrees Fahrenheit is used.

3. The method according to claim 2, in which the pressure range is from one hundred fifty to two hundred fifty pounds per square inch and the temperature range is from two hundred fifty to three hundred degrees Fahrenheit.

JOHN M. MARSHALL.

References Cited in the file of this patent

UNITED STATES PATENTS

| Number | Name | Date |
|---|---|---|
| 2,367,443 | Snyder | Jan. 16, 1945 |
| 2,373,285 | Baer | Apr. 10, 1945 |
| 2,541,498 | Calvert | Feb. 13, 1951 |